US011952111B2

(12) United States Patent
Stamps et al.

(10) Patent No.: US 11,952,111 B2
(45) Date of Patent: Apr. 9, 2024

(54) ELECTRONIC CONTROL OF BLADE PITCH ON A TILTROTOR

(71) Applicant: Bell Textron Inc., Fort Worth, TX (US)

(72) Inventors: Frank Bradley Stamps, Colleyville, TX (US); Thomas C. Parham, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 640 days.

(21) Appl. No.: 16/862,276

(22) Filed: Apr. 29, 2020

(65) Prior Publication Data

US 2021/0163128 A1 Jun. 3, 2021

Related U.S. Application Data

(60) Provisional application No. 62/942,709, filed on Dec. 2, 2019.

(51) Int. Cl.
*B64C 27/605* (2006.01)
*B64C 27/57* (2006.01)
*B64C 27/64* (2006.01)
*B64C 27/68* (2006.01)
*B64C 29/00* (2006.01)

(52) U.S. Cl.
CPC .......... *B64C 29/0033* (2013.01); *B64C 27/57* (2013.01); *B64C 27/605* (2013.01); *B64C 27/64* (2013.01); *B64C 27/68* (2013.01)

(58) Field of Classification Search
CPC ... B64D 29/0033; B64C 27/57; B64C 27/605; B64C 27/64; B64C 27/68; B64C 29/0033
See application file for complete search history.

(56) References Cited

U.S. PATENT DOCUMENTS

2019/0118942 A1* 4/2019 Kim ...................... B64C 11/06

FOREIGN PATENT DOCUMENTS

WO WO-2012161680 A1 * 11/2012 ............. B64C 11/06

* cited by examiner

*Primary Examiner* — David E Sosnowski
*Assistant Examiner* — Jason G Davis
(74) *Attorney, Agent, or Firm* — Lightfoot & Alford PLLC

(57) ABSTRACT

A system is provided for controlling the pitch of blades of a rotor, the system comprising an actuator for each blade, each actuator being configured for selective control of the pitch of an associated blade about a pitch axis. Sensors are configured for determining aerodynamic forces acting on the rotor, and a flight control system is configured to receive signals from the sensors and for operating the actuators in response to the signals to achieve a desired pitch-flap coupling value.

19 Claims, 5 Drawing Sheets

ELECTRONIC CONTROL OF BLADE PITCH ON A TILTROTOR

CROSS-REFERENCE TO RELATED APPLICATIONS

This application claims priority to U.S. Provisional Patent Application No. 62/942,709, filed on 2 Dec. 2019 by Frank Bradley Stamps, et al., and titled "Electronic Control of Blade Pitch on a Tiltrotor," the disclosure of which is incorporated by reference in its entirety.

STATEMENT REGARDING FEDERALLY SPONSORED RESEARCH OR DEVELOPMENT

Not applicable.

BACKGROUND

The control systems for helicopters and tiltrotor aircraft are complex electrical and/or mechanical systems. The control systems respond to the pilot's input, but also must accommodate forces acting upon rotor assemblies and generally outside the control of the pilot. Mechanical control systems typically include a swashplate arrangement which consists of an inboard non-rotating plate and an outboard rotating plate. Typically, the swashplate assembly has the ability to translate axially along a mast and/or tilt relative to the mast. The rotating plate is free to rotate relative to the non-rotating portion. Pilot inputs alter the axial position of the swashplate assembly through the collective control and the tilt of the swashplate assembly through the cyclic control.

In the prior art, the rotating plate is typically connected mechanically to each individual rotor blade. For example, in one type of control system, pitch links are connected to pitch horns carried by the rotor blade, thus allowing the rotating plate to control the blade angle of each rotor blade. However, it is necessary to include in control systems a subsystem which reduces the degree of flapping as much as possible. In the prior art, there are two basic approaches: one is to utilize a delta-3 hinge; the other is to utilize offset pitch horns. In tiltrotor aircraft, it is especially important to counteract the detrimental effects of flapping, especially because the aircraft is capable of very high speed travel, particularly in the airplane mode of flight. A feedback control system is disclosed in U.S. Pat. No. 6,616,095, titled "Coupled Aircraft Rotor System," and the entire disclosure of which is incorporated herein.

FIGS. 1, 2, and 3 illustrate a tiltrotor aircraft in flight. FIG. 1 depicts aircraft 11 in an airplane mode of flight operation, tiltrotor having a fuselage 13 and wings 15, 17 for providing lift during forward flight. Rotors 19, 21 are composed of a plurality of rotor blades and rotated by engines carried in pylons 23, 25 rotatable relative to wings 15, 17, and the thrust from rotors 19, 21 is directed aft in airplane mode. FIG. 3 depicts aircraft 11 in a helicopter mode of flight, with thrust from rotors 19, 21 directed downward. Rotation of pylons 23, 25 allows for switching between the aircraft and helicopter modes of flight. FIG. 2 depicts aircraft 11 in a transition mode.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges control systems for rotors of a tiltrotor aircraft and methods for controlling the rotors. Each system allows for a control-system configuration providing for electronic control of blade pitch, thereby allowing for mitigation or prevention of undesirable rotor behaviors that may occur during flight in airplane mode.

Figure 1:
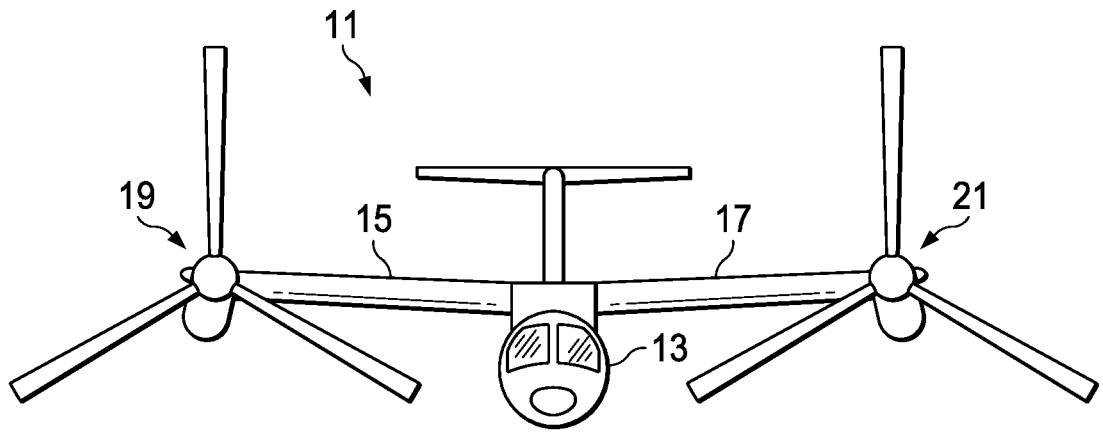
FIGS. 1 through 3 depict a tiltrotor aircraft according to this disclosure.
Figure 2:
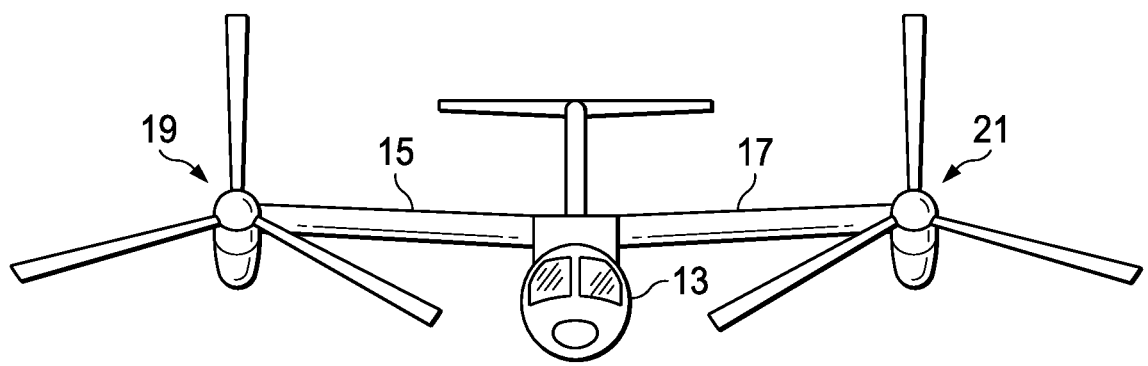
Figure 3:
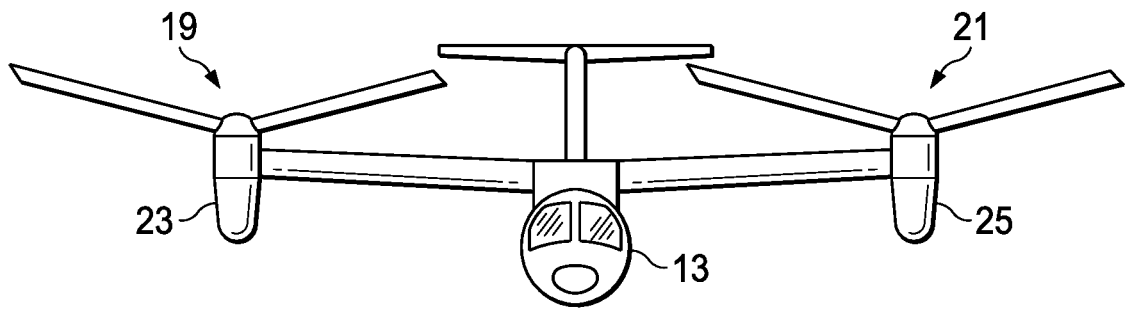
Figure 4:
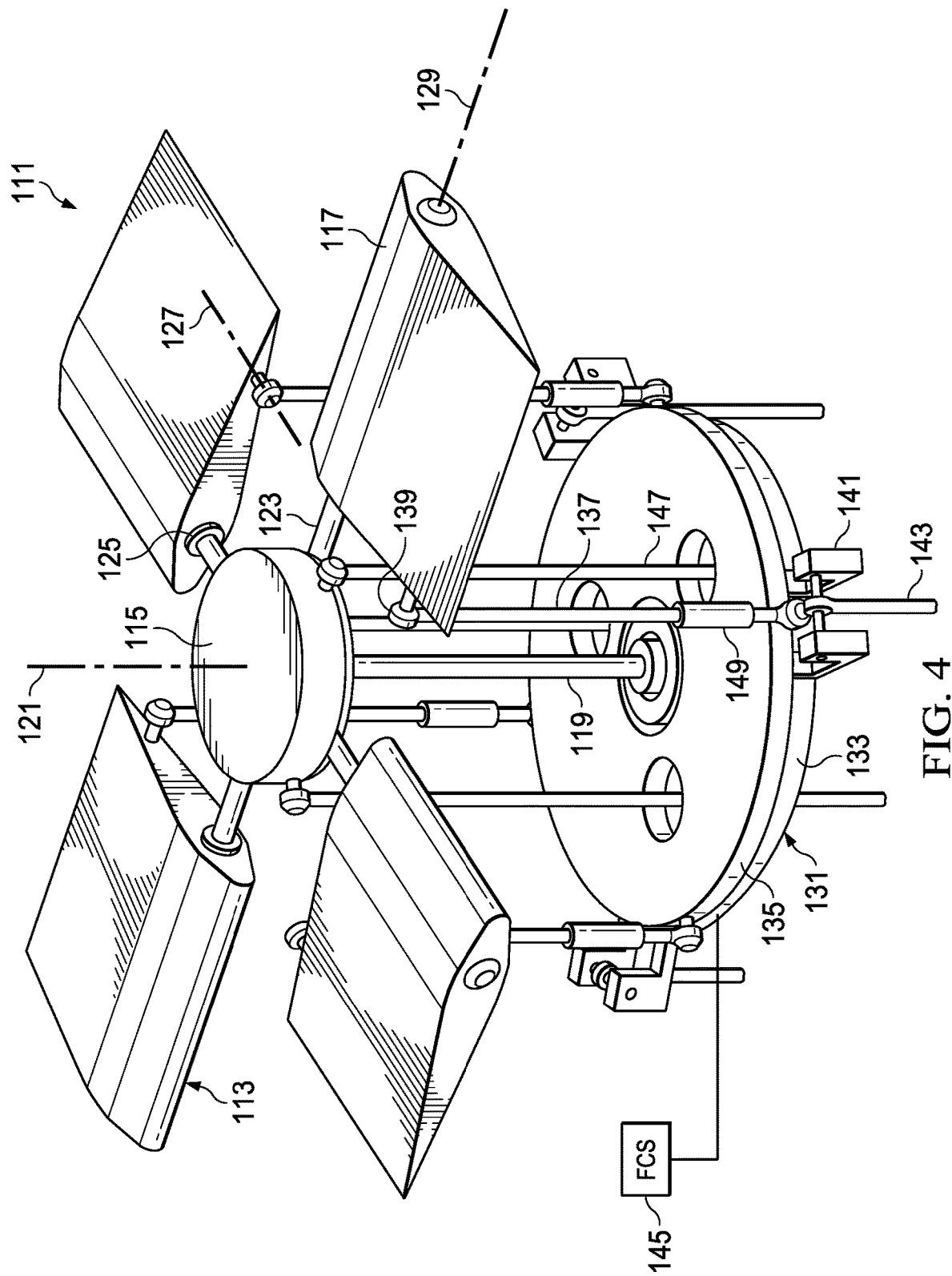
FIG. 4 is an oblique view of a portion of a rotor and control system according to this disclosure and configured for use on the aircraft of FIG. 1.
Figure 5:
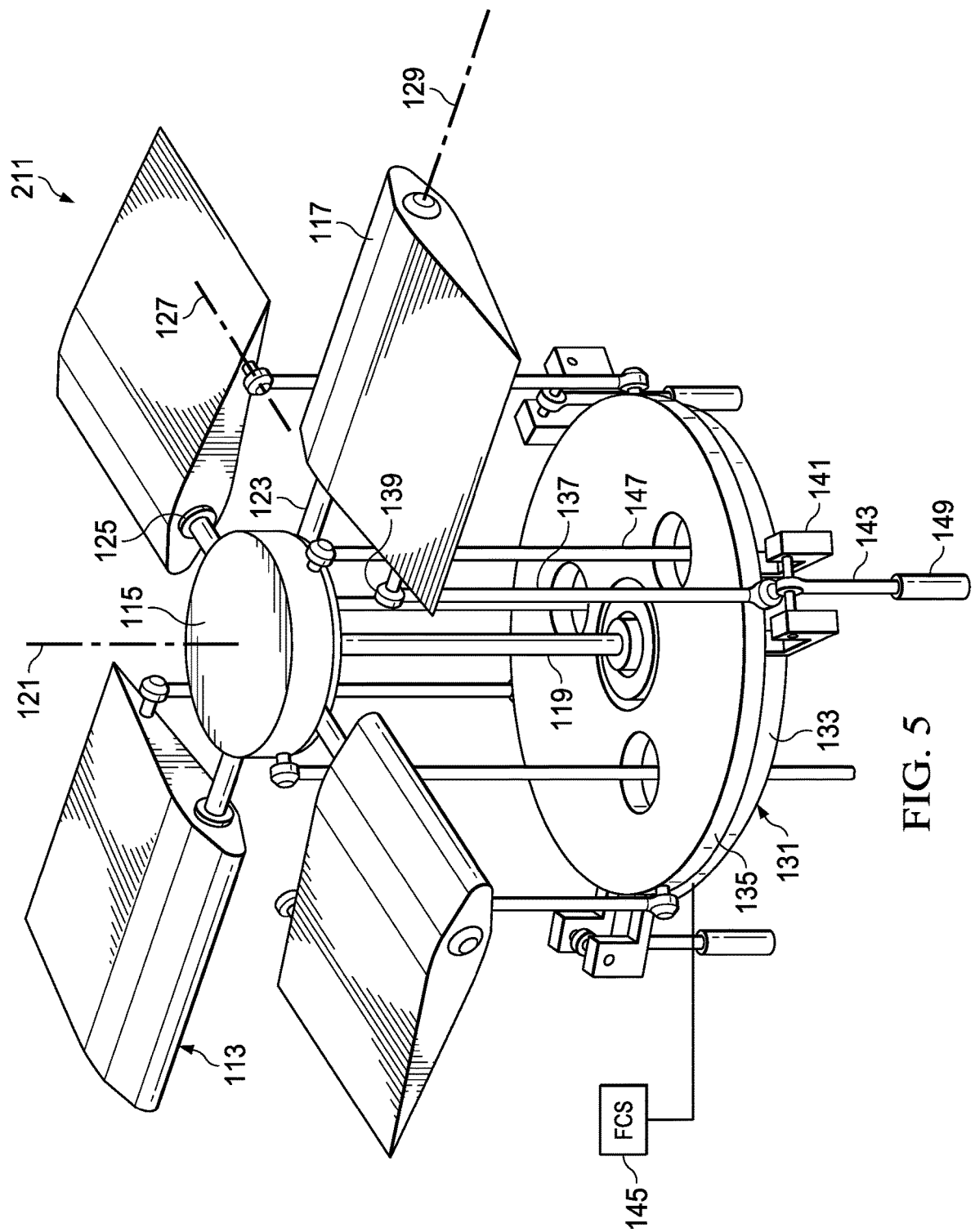
FIG. 5 is an oblique view of a portion of another embodiment of a rotor and control system according to this disclosure and configured for use on the aircraft of FIG. 1.

FIGS. 4 and 5 illustrate example embodiments of a rotor and control system assembly according to this disclosure. Assemblies 111 and 211 each have a rotor 113, comprising a central hub 115 and blades 117 coupled to hub 115 for rotation with a mast 119 about a mast axis 121. Each blade 117 is coupled to hub 115 by arms 123, which may be discrete members or portions of a yoke. In the embodiment shown, hub 115 is configured to gimbal relative to mast 119, allowing for out-of-plane flapping motions of blades 117, in which blades 117 on opposite sides of hub 115 move in opposite directions. To allow for out-of-plane coning motion of each blade 117, in which blades 117 on opposite sides of hub 115 move in the same direction, each blade 117 is coupled to the associated arm 123 with a coning hinge 125 having a coning-hinge axis 127. Alternatively, each arm 123 may comprise a flexure portion to allow for coning motion about a virtual coning hinge. Each blade 117 is also configured for rotation relative to hub 115 about a pitch axis 129.

A swashplate 131 comprises a nonrotating plate 133 and a rotating plate 135, with plate 135 being free to rotate in one degree of freedom relative to plate 133 while motions of plate 133 are transferred to plate 135. A pitch rod 137 couples rotating plate 135 to a pitch horn 139 of each blade 117, allowing for swashplate 131 to control the pitch of blades 117. Swashplate 131 is configured for translation along and relative to mast 119 for collective control of blade pitch, and swashplate 131 is configured for tilting relative to mast 119 for cyclic control of blade pitch. Clevises 141 on nonrotating plate 133 are coupled with control rods 143 to an actuation system configured for causing motion of swashplate 131 in response to inputs by a pilot and/or flight-control system (FCS) 145. Rods 147 may optionally be used to transfer flapping motion of hub 115 to sensors for measuring and communicating to FCS 145 the magnitude and direction of flapping motions, or flapping motion may be measured and communicated to FCS 145 by sensors within hub 115. While shown as being behind axis 129 relative to the direction of rotation of rotor 113, pitch horns 139 may alternatively be located forward of axis 129.

To allow for electronic control of the pitch angle of blades 117, assembly 111 of FIG. 4 and assembly 211 of FIG. 5 show embodiments incorporating linear actuators 149, which may be electric, hydraulic, or electrohydraulic. In assembly 111, an actuator 149 is installed within each pitch rod 137, allowing for FCS 145 to operate actuator 149 to control the length of each rod 137. In assembly 211, an actuator 149 is installed within each control rod 143, allowing for FCS 145 to operate actuator 149 to alter the length of each rod 143. An advantage to having actuators in the non-rotating portion is that no hydraulic or electrical slip ring is needed to cross the gap to the rotating system. In alternative embodiments, each linear actuator 149 may be located at one end of the associated pitch rod 137 or control rod 143 for altering the axial position of pitch rod 137 relative to swashplate 131 or pitch horn 139 or control rod 143 relative to swashplate 131.

In assemblies 111, 211, the location of the connection of each pitch horn 139 to the associated pitch rod 137 provides for minimized delta-0 (pitch-cone coupling), as the connection is located on or near coning hinge 125. However, in other embodiments, pitch horns 139 may be located elsewhere, have a greater length, or have a configuration that places the pitch-rod connection at a location producing unfavorable delta-0 or both unfavorable delta-3 (pitch-flap coupling) and unfavorable delta-0. Using the systems and methods disclosed herein allows for compensation for these unfavorable couplings.

Electronic control of delta-3 can be used on tiltrotors, such as aircraft 11, having 3 or more blades and may allow for placement of pitch horns in locations otherwise unavailable for use due to unfavorable delta-3 and/or delta-0 coupling. One example, as shown in FIGS. 4 and 5, is positioning the connections of pitch horns 139 to pitch rods 137 at or near coning hinge 125, thereby producing a favorable delta-0 for flight in airplane mode. This might be necessary with rotors having four or more blades 117. However, this may produce unfavorable delta-3, but FCS 145 can use electronic control of delta-3 in response to parameters of the rotor, drive system, or aircraft that are measured during flight. For example, the start of whirl flutter may be detected using flapping as one of the symptoms and then operating actuators 149 to damp the whirl flutter. However, flapping is not always present, and other parameters may be more useful, such as looking for effects in the pylon.

In the rotating system, flapping, shear forces on the hub, and mast bending may be measured by sensors and communicated to FCS 145 for use in determining when and how much delta-3 should be added to the system. Flapping may be measured using, for example:

a. hub-mounted sensors that measure tilting of the hub relative to the mast due to gimbaling; and/or b. rod-actuated sensors measuring tilting of the hub, as illustrated in the figures; and/or c. accelerometers mounted on the hub, yoke, or blades.

Hub shears may be measured using, for example, hub-mounted accelerometers, whereas mast bending may be measured using, for example, mast-mounted strain gauges.

In the nonrotating system, pylon bending and wing bending may be measured by sensors and communicated to FCS 145 for use in determining when and how much delta-3 should be added to the system. For example, pylon bending, such as bending in the transmission case, may be measured using, for example, accelerometers and/or strain gauges in various locations. Likewise, wing bending may also be measured using, for example, wing-mounted accelerometers and/or strain gauges.

Electronic control of delta-0 can be used on tiltrotors having 3 or more blades and may allow for placement of pitch horns in locations otherwise unavailable for use due to unfavorable delta-3 or delta-0 coupling. Though the connections of pitch horns 139 to pitch rods 137 shown in FIGS. 4 and 5 is at or near coning hinge 125, the number of blades or other criteria may require a pitch horn configuration that produces both unfavorable delta-3 and unfavorable delta-0. FCS 145 may be configured to use electronic control of both delta-3 and delta-0 in response to parameters of the rotor, drive system, or aircraft that are measured during flight. To provide for proper control of delta-0, coning motion of the blades may be measured using, for example, angle sensors and/or accelerometers. In addition, torque sensors can be used to measure torque at the engine, mast, transmission, and/or interconnect driveline, which extends between the pylons and couples the rotors for continued operation using one engine, allowing for measuring a differential between the rotors. The control system can be used to alleviate these loads in the interconnect driveline by adjusting the collective and correcting errors in the flight path by adjusting collective and/or cyclic.

Figure 6:
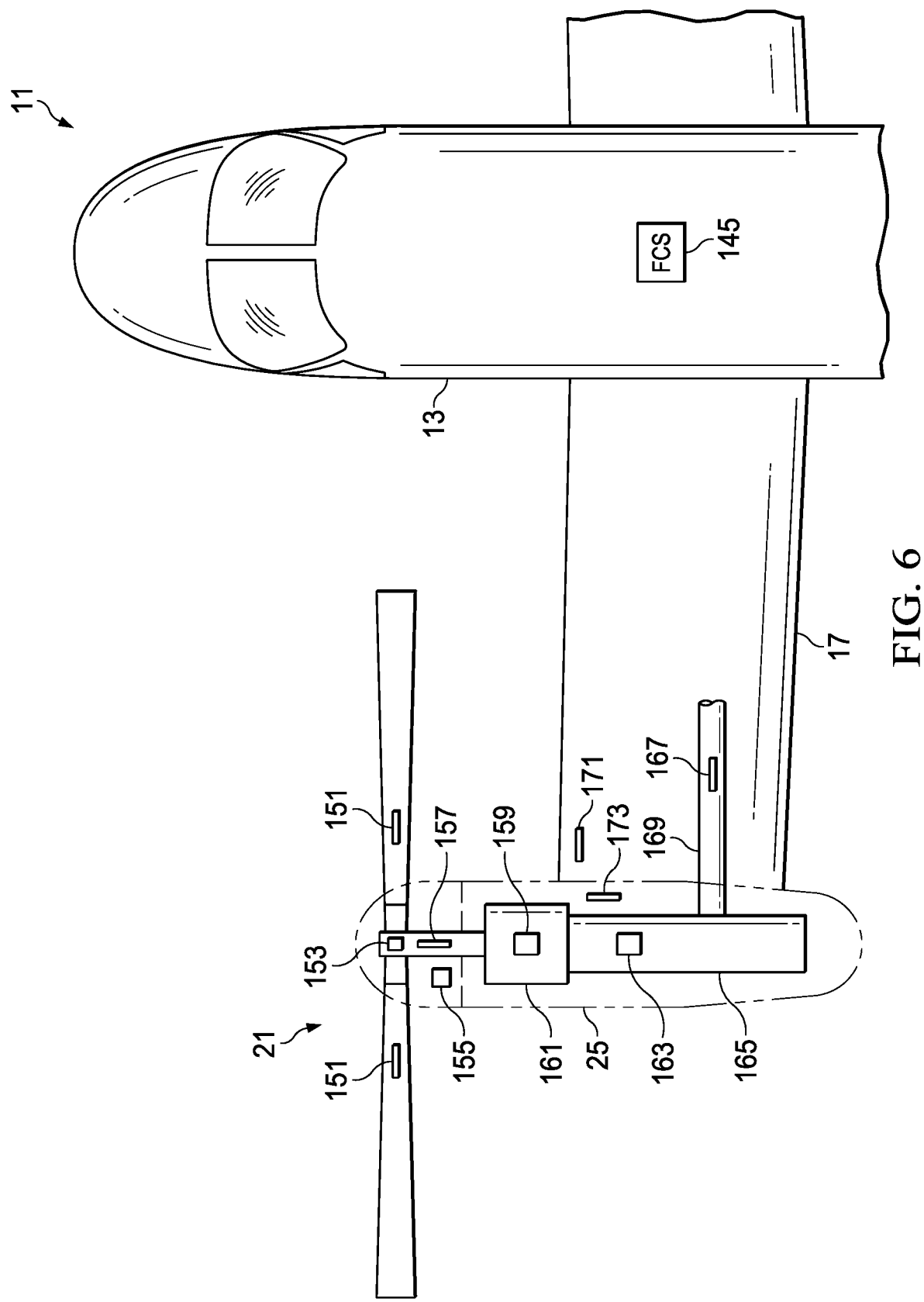
FIG. 6 is a schematic top view of a portion of the aircraft of FIG. 1 showing example sensor locations.

FIG. 6 schematically illustrates example sensor locations on one side of aircraft 11 for measuring parameters described above, though it may not be necessary to have sensors in all locations for every application. Sensor locations would typically be duplicated on the other side of aircraft 11, and each sensor is in wired or wireless communication with FCS 145 for transmitting and receiving signals therebetween. Sensors 151 measure parameters related to an associated blade of rotor 21, and sensors 153 and 155 measure tilting of the hub and forces acting on the hub. Sensor 157 measures parameters related to the mast, and sensor 159 measures parameters related to transmission 161. Sensor 163 measures parameters related to engine 165, and sensor 167 measures parameters related to interconnect driveline 169. Sensor 171 measures parameters related to wing 17, and sensor 173 measures parameters related to pylon 25.

A significant advantage to using the control system according to this disclosure is that tilting happens at 1/rev, which is much faster than a pilot can apply corrective inputs. Instead, the system sums changes made by the system with pilot inputs, and the relatively small changes made by the system occur while still achieving the goal of the pilot input.

In order to provide for robust redundancy and fault tolerance, the system preferably includes modes for voting, fault detection, and fail-safe operation. In voting and fault detection, multiple sensors are preferably used to measure each parameter, and signals associated with a specific parameter are compared by FCS 145 to determine whether a signal is an outlier and should be disregarded. For example, multiple sensors would be used to measure tilting of the hub relative to the mast, and any sensor communicating a signal that substantially differs from the other sensors will likely be removed from calculations and may be ignored until service due to a detected fault. Alternatively, or as required for certain parameters, signals from sensors measuring various parameters can be compared by FCS 145 to determine if the indicated values correspond between the arrays of sensors. In fail-safe mode, FCS 145 will command the actuators to move to a selected position for achieving compromise values of delta-0 and/or delta-3, allowing for return to base or for immediate landing. FCS 145 may preferably limit aircraft airspeed to a selected maximum (e.g., 200 kts) and automatically slow the aircraft if airspeed exceeds the allowed maximum.

An advantage to locating actuators 149 on pitch rods 137 within the rotating system, as in FIG. 4, is that the system can control for delta-0 and delta-3, as described above, and provide higher harmonic control, such as for vibration control.

One phenomenon that can be encountered with certain configurations of rotors is "chugging," which can occur when a positive delta-0 coupling causes increased pitch with increased coning. The system of this disclosure can be used to provide electronic suppression of chugging by translating the swashplate in collective motion.

Though FIGS. 4 and 5 illustrate gimbaled rotors, the system of this disclosure may also be used with articulated rotors, rigid rotors, and rotors with discrete flap hinges.

Figure 7:
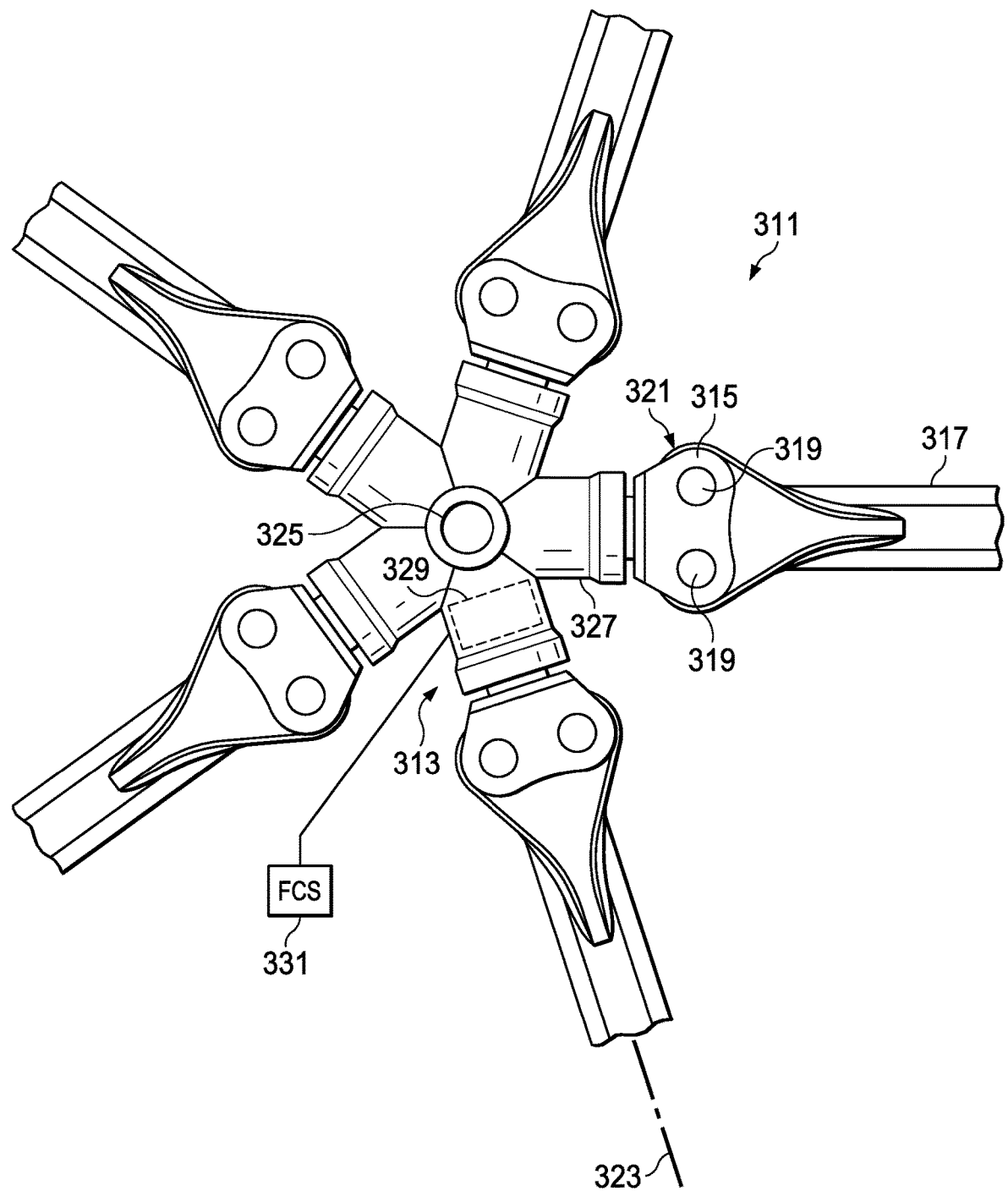
FIG. 7 is a top view of a portion of another embodiment of a rotor and control system according to this disclosure and configured for use on the aircraft of FIG. 1.

For example, FIG. 7 illustrates a rigid rotor 311 comprising hub 313, grips 315, and blades 317. Blades 317 are retained within grips 315 with pins 319 to form a blade assembly 321, such that the root end of each blade 317 is free to rotate only about pitch axis 323, though blades 317 may be configured to allow for flapping or lead/lag motions through deformation of blades 317. Hub 313 is coupled to mast 325 for rotation therewith about a mast axis. In the embodiment shown, hub 313 comprises a plurality of arms 327 extending radially, one arm 327 provided for each blade assembly 321.

For control of the pitch of blades 317, rotor 311 can be configured for use with a swashplate control system and linear actuators, like that described above for assemblies 111 and 211. In addition, electronic control of blade pitch according to this disclosure may also be used with a swashplate-less rotor design, in which rotary actuators or similar devices are actuated to control blade pitch. In the embodiment of FIG. 6, each arm 327 of hub 313 houses a rotary actuator 329 for causing rotation of the associated blade assembly 321 about the corresponding pitch axis 323. Each actuator 329 is in electronic communication with FCS 331, which provides for control of actuators 329 in response to pilot inputs or automated inputs. Sensors, such as those described above and located as described above, are used to measure parameters of rotor 311 and are in electronic communication with FCS 331. FCS 331 controls the pitch of blades 317 in the same manner described above to minimize or eliminate unwanted behaviors of rotor 311.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A system for controlling a pitch of each blade of a rotor, the system comprising:
   an actuator for each blade, each actuator configured for selective control of the pitch of an associated blade about a pitch axis;
   sensors configured for determining aerodynamic forces acting on the rotor; and
   a flight control system configured to receive signals from the sensors and for operating the actuators;
   wherein the flight control system operates the actuators in response to the signals to achieve a desired pitch-flap coupling value.

2. The system of claim 1, further comprising:
   a swashplate; and
   a pitch rod for each blade, each pitch rod coupling a rotating plate of the swashplate to an associated blade;
   wherein each actuator is configured for altering a length or axial position of the associated pitch rod for controlling the pitch of the associated blade.

3. The system of claim 1, wherein at least one of the sensors is configured for determining direction and magnitude of out-of-plane motion of at least one of the blades.

4. The system of claim 1, wherein each actuator is an electric actuator, hydraulic actuator, or electrohydraulic actuator.

5. The system of claim 1, wherein each actuator is a linear actuator.

6. The system of claim 1, wherein the flight control system operates the actuators in response to the signals to damp whirl flutter in the rotor.

7. The system of claim 1, wherein the flight control system operates the actuators in response to the signals to damp chugging in the rotor.

8. A system for controlling a pitch of each blade of a rotor, the system comprising:
   a swashplate;
   a pitch rod for each blade, each pitch rod coupling a rotating plate of the swashplate to an associated blade in a manner to achieve an inherent first pitch-cone coupling value and an inherent first pitch-flap coupling value;

an actuator for each pitch rod, each actuator being configured for altering a length or axial position of the associated pitch rod for controlling the pitch of the associated blade;

sensors configured for determining direction and magnitude of out-of-plane motion of at least one of the blades; and a flight control system configured to receive signals from the sensors and for operating the actuators;

wherein the flight control system operates the actuators in response to the signals from the sensors to achieve at least one of a desired second pitch-cone coupling value or a desired second pitch-flap coupling value.

9. The system of claim 8, wherein each actuator is an electric actuator, hydraulic actuator, or electrohydraulic actuator.

10. The system of claim 8, wherein each actuator is a linear actuator.

11. The system of claim 8, wherein the flight control system operates the actuators in response to the signals to damp whirl flutter in the rotor.

12. The system of claim 8, wherein the flight control system operates the actuators in response to the signals to damp chugging in the rotor.

13. A system for controlling a pitch of each blade of a rotor, the system comprising:

an actuator for each blade, each actuator configured for selective control of the pitch of an associated blade about a pitch axis;

sensors configured for determining aerodynamic forces acting on the rotor; and a flight control system configured to receive signals from the sensors and for operating the actuators;

wherein the flight control system operates the actuators in response to the signals to achieve a desired pitch-cone coupling value.

14. The system of claim 13, further comprising:

a swashplate; and a pitch rod for each blade, each pitch rod coupling a rotating plate of the swashplate to an associated blade;

wherein each actuator is configured for altering a length or axial position of the associated pitch rod for controlling the pitch of the associated blade.

15. The system of claim 13, wherein at least one of the sensors is configured for determining direction and magnitude of out-of-plane motion of at least one of the blades.

16. The system of claim 13, wherein each actuator is an electric actuator, hydraulic actuator, or electrohydraulic actuator.

17. The system of claim 13, wherein each actuator is a linear actuator.

18. The system of claim 13, wherein the flight control system operates the actuators in response to the signals to damp whirl flutter in the rotor.

19. The system of claim 13, wherein the flight control system operates the actuators in response to the signals to damp chugging in the rotor.

* * * * *